United States Patent [19]

Li

[11] 4,303,834

[45] Dec. 1, 1981

[54] CABLE WIND MILL

[75] Inventor: Yao T. Li, Lincoln, Mass.

[73] Assignee: Massachusetts Institute of Technology, Cambridge, Mass.

[21] Appl. No.: 37,667

[22] Filed: May 10, 1979

[51] Int. Cl.³ .................. F01D 23/00; F03D 5/02
[52] U.S. Cl. ............................ 290/55; 415/2 R; 415/5; 416/7; 416/8
[58] Field of Search ............... 290/55, 44, 42, 43, 290/53, 54; 415/2, 5; 416/7, 8; 198/815, 826; 60/398

[56] References Cited

U.S. PATENT DOCUMENTS

| | | | |
|---|---|---|---|
| 435,652 | 9/1890 | Parker | 416/12 |
| 1,355,672 | 10/1920 | Howden | 290/44 |
| 2,393,563 | 1/1946 | Petterson | 198/815 |
| 2,642,982 | 6/1953 | Andershock | 198/864 |
| 3,730,643 | 5/1973 | Davison | 290/55 |
| 4,175,910 | 11/1979 | Nilberg | 415/5 |

FOREIGN PATENT DOCUMENTS

| | | | |
|---|---|---|---|
| 2152637 | 4/1973 | Fed. Rep. of Germany | 415/5 |
| 2340459 | 9/1977 | France | 415/5 |

Primary Examiner—B. Dobeck
Assistant Examiner—Shelley Wade
Attorney, Agent, or Firm—Arthur A. Smith, Jr.; Robert J. Horn, Jr.; Peter J. Manus

[57] ABSTRACT

Disclosed is a wind power generating apparatus for producing megawatt levels of power. The apparatus comprises at least one endless flexible cable supported on the peripheries of two spaced apart wheels. Airfoils are attached to the cable and disposed for generating aerodynamic forces which cause the cable and supporting wheels to turn allowing for the generation of power.

8 Claims, 8 Drawing Figures

CABLE WIND MILL

BACKGROUND OF THE INVENTION

This invention relates to wind power generating apparatus and more particularly to such apparatus for generating megawatt levels of power.

Wind mills for generating electricity are well known in the power generating art. There are difficulties with wind mills, however, when they are scaled to provide large quantities of power. As the blades of conventional wind mills are made bigger to extract more energy from the wind, the aerodynamic and inertial loads grow apace, often resulting in fatigue induced blade failure after brief periods of operation.

It is an object of this invention, therefore, to provide apparatus for generating megawatt levels of power from the wind.

It is a further object to provide such apparatus which is durable, and capable of a long operating life.

A still further object is such an apparatus which is relatively easily designed and built and which relies substantially on existing technologies.

SUMMARY OF THE INVENTION

The wind power generating apparatus according to the present invention comprises at least one endless flexible cable supported on the peripheries of two spaced apart wheels, the cable thereby forming an elongate loop. The plane of the loop is oriented substantially perpendicular to the wind direction. A plurality of airfoils are attached to the cable at spaced apart intervals along the cable. These airfoils are disposed for generating aerodynamic forces in a first directional along the cable when the airfoils are on one side of the loop and in the opposite direction when the airfoils are on the other side of the loop. These aerodynamic forces therefore cause the cable and the wheels to rotate. Means are provided for absorbing power from at least one of the rotating wheels.

In a preferred embodiment of the present invention, the wind generating apparatus comprises two flexible cables and two spaced apart pairs of coaxial wheels for supporting the cables to form elongate loops. Each wheel of the pair is adapted for supporting one of the cables on its periphery. A plurality of cross members straddle and are attached to the cable at intervals along its length. Each of the cross members is adapted for carrying at least one airfoil. In this embodiment means are provided for applying lateral force to the cable at least at one location to counteract the lateral wind loading on the cable arising from the action of the wind on the airfoils. It is preferred that the means for applying the lateral force to the cable comprise a plurality of idler wheels mounted on an equalizing carriage and adapted to engage the cable from the side. The carriage is arranged to apply lateral force in direct proportion to the lateral deflection of the cable.

In one embodiment of this invention, the pitch angle of the airfoils with respect to the cable is fixed. In another embodiment the pitch angle of each of the airfoils with respect to the cable is adjusted continuously along the cable length to improve power generation efficiency. Such continuous adjustment is accomplished by automatic control system means comprising a sensor located on each of the airfoils to detect the relative wind direction and means responsive to that sensor to vary the pitch angle of the airfoil. The automatic control system may also be adapted for adjusting the airfoil pitch angles to provide aerodynamic damping.

It is preferred that at least one of the cable supporting wheels be mounted in a fashion so as to maintain constant cable tension. In such an embodiment, the supporting wheel is mounted within a yoke and the yoke counterbalanced by weights to maintain constant cable tension.

In yet another embodiment of the invention, the torque resisting rotation of the cable supporting wheels during power generation is selectively adjustable to maintain the proper separation of the cable on adjacent sides of the loop. This feature is desirable so that the airfoils on opposite sides of the loop do not collide with one another.

For extracting useful power from the wind, it is preferred that one or both of the supporting wheels be coupled to an electrical generator. Alternatively, one or both of the wheels may be coupled to means for pumping water from a lower to a higher elevation thereby storing energy for future use.

DESCRIPTION OF THE PREFERRED EMBODIMENT

Figure 1:
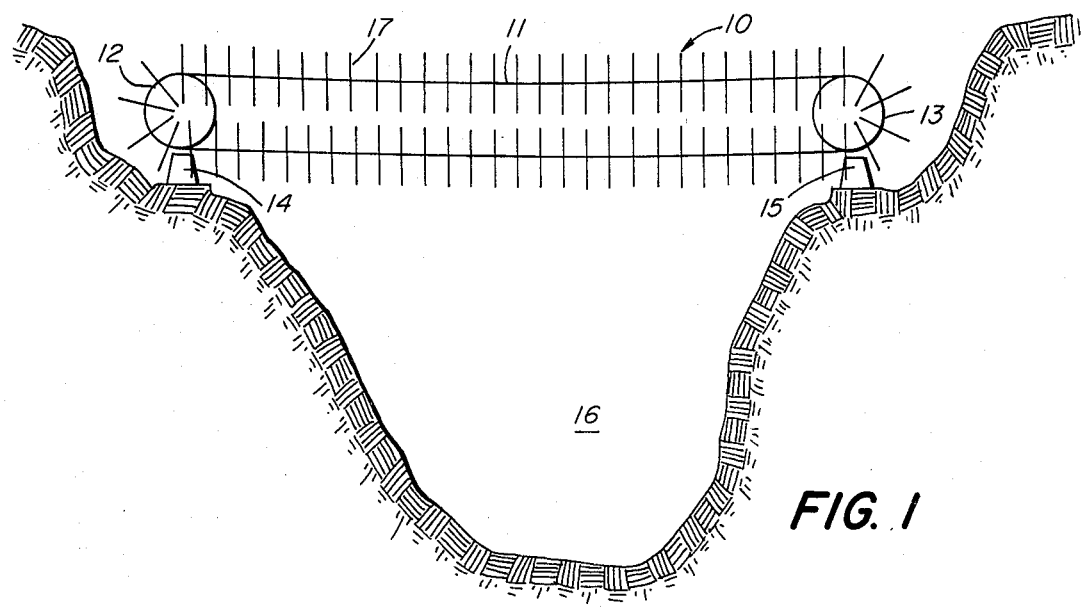
FIG. 1 is a representation of the invention disclosed herein.

Referring first to FIG. 1, the cable wind mill 10 comprises endless flexible cable 11 stretched over the peripheries of two large diameter wheels 12 and 13. The wheels 12 and 13 are supported by the structures 14 and 15 so that the cable wind mill 10 spans the valley 16. A suitable means of power generation (not shown) is coupled with the wheels 12 and 13. It is preferred that the apparatus disclosed herein be used across a valley because a valley provides a natural venturi effect to guide and intensify the wind. Additionally, the sides of the mountain provide the rigid supports needed for this configuration. In addition, mountainous terrain provides a natural setting for installing reservoirs at different elevations when the wind power is used to raise water from a lower to a higher elevation as a way of storing the energy extracted from the wind.

Figure 2:
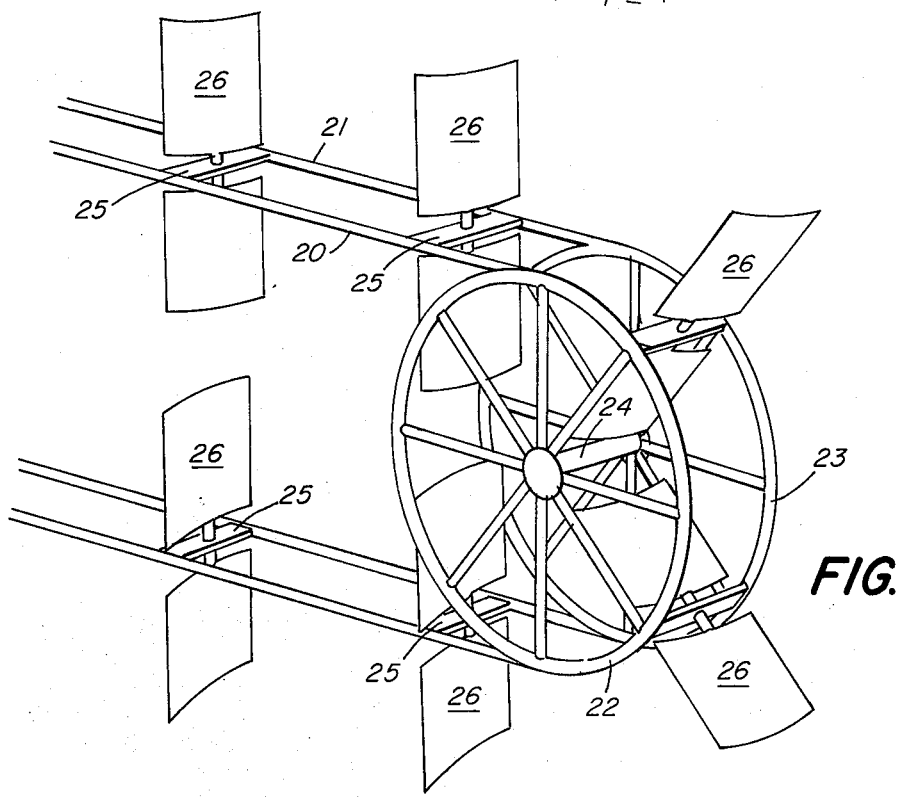
FIG. 2 is a perspective view of a preferred embodiment.

Attached to the cable 11 at regular intervals are airfoils 17 which are disposed for generating aerodynamic forces along the cable when wind blows in a direction perpendicular to the plane of FIG. 1. The arrangement of FIG. 1 near one end of the cable system is shown more clearly in FIG. 2. In FIG. 2 two cables 20 and 21 are supported by the two wheels 22 and 23 on a common shaft 24. The two cables are connected by the cross members 25. The arrangement of two cables connected by cross members provides appropriate torsional rigidity. Attached to the cross members 25 are airfoils 26. The airfoil blades are arranged symmetrically above and below the cross members 25. It is to be noted that the direction of travel of the cables 20 and 21 and the orientation of the airfoil blades 26 reverse as they pass over the wheels. For this reason the pitch angle need not be changed as the airfoil moves from the top of the cable loop to the bottom or vice versa. That is, the aerodynamic forces will be in the correct sense to cause the cable and wheels to rotate thereby enabling the generation of power.

Figure 3:
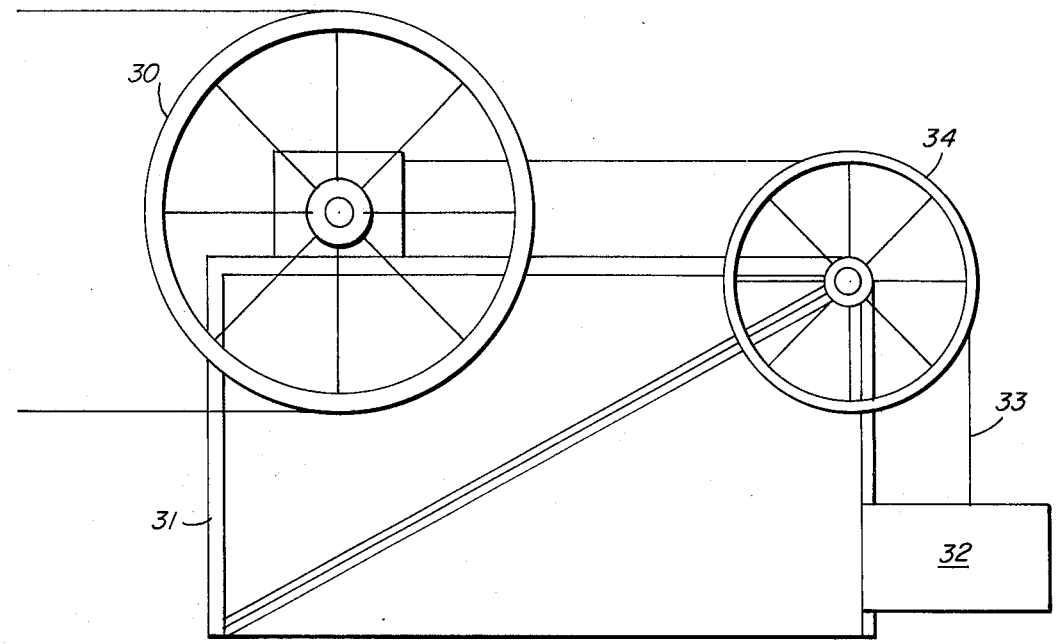
FIG. 3 is an elevational view of the wheel support system.

In order that cable tension remain nearly constant it is preferred that the support wheels be mounted as shown in FIG. 3. Here cable support wheel 30 is mounted on support structure 31 so that wheel 30 has a degree of freedom to move left and right in FIG. 3. The cable tension is counterbalanced by weight 32 through inextensible cable 33 riding over idler wheel 34.

Figure 4:
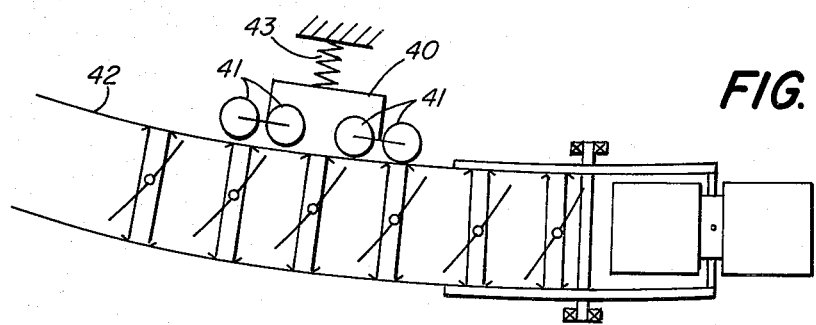
FIG. 4 is a plan view of an embodiment of the invention showing means for controlling lateral deflection.
Figure 8:
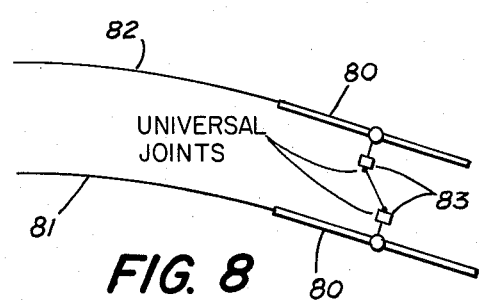
FIG. 8 is an embodiment showing means for aligning the wheels with the cable.

It is recognized that the aerodynamic forces on the airfoils are not confined to a direction along the cables but also have a component in the lateral direction. These forces cause the cable system to bow laterally. To counteract this tendency to bow, the arrangement of FIG. 4 is employed. An equalizing carriage 40 supports idler wheels 41 which engage the side of cable 42. The carriage 40 itself is restrained by spring 43 or equivalent so that deflections of the cable 42 are opposed by a force as needed to maintain a gentle curvature. Each cable should be treated identically to maintain the cross members level so that the airfoils remain vertical. A similar equalizing carriage may also be used on the other side of the cable system for wind flow in the opposite direction. Now, alternatively as shown in FIG. 8, the cable supporting wheels 80 can be individually pivoted to revolve about a vertical axis (perpendicular to the plane of FIG. 8) to align themselves with the lateral bending of the cables 81 and 82. Each pair of the cable supporting wheels 80 can be coupled through flexible means such as a pair of universal joints 83 to allow each wheel 80 to align itself with the lateral cable angle and to maintain equal cable sag as shown in FIG. 8.

Figure 5:
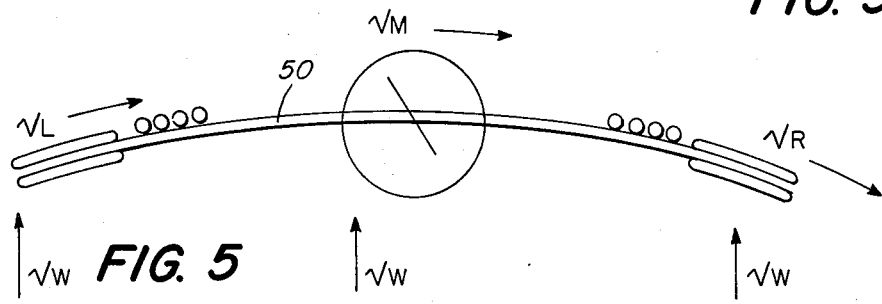
FIG. 5 is a diagrammatic representation of relative wind directions.
Figure 6:
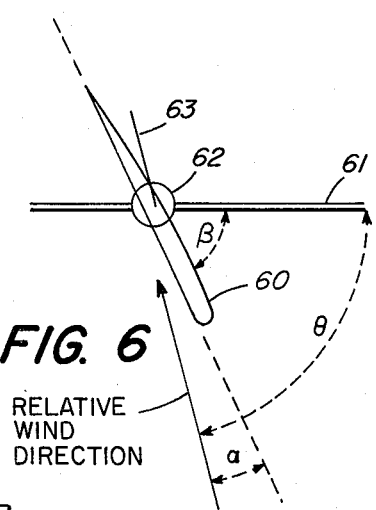
FIG. 6 is an enlarged view of the area within the circle of FIG. 5.

Even with the equalizing carriage 40 of FIG. 4 there will be some lateral deflection of the cables. Such lateral deflection changes the angle that the airfoil makes with the relative wind and hence also changes the aerodynamic loading. This effect is shown in FIG. 5. The velocity of the cable and airfoils on the left side of FIG. 5 is denoted as $V_L$, that at the middle as $V_m$ and that at the right hand side as $V_R$. The wind direction is $V_w$. The relative wind to which an airfoil responds (that is, the vector sum of the airfoil velocity and the wind velocity relative to the same coordinate system) is thus different at different locations along the cable 50. This may be seen with reference to FIG. 6. The angle the airfoil 60 makes with cable 61 is $\beta$; the relative wind forms an angle $\theta$ with cable 61. The angle of attack of the airfoil 60 is therefore the angle $\alpha = \theta - \beta$. For a fixed $\beta$, therefore, the angle of attack $\alpha$ changes with changes in the relative wind direction. Referring again to FIG. 5, it may thus be seen that the angle of attack (and thus the aerodynamic loading) is higher on the left side than on the right side of FIG. 5 for fixed $\beta$ and wind direction because of the lateral deflection of the cable 50.

So as more nearly to equalize the aerodynamic loading on each airfoil independent of its location along the cable and thereby to increase the efficiency of energy extraction from the wind, the angle $\beta$ can be adjusted in real time for each airfoil independently. Referring to FIG. 6 again, the airfoil 60 is connected to the cable 61 through actuator 62 which adjusts the angle $\beta$ that airfoil 60 makes with cable 61. Actuator 62 is an electric servo motor, for example. The angle $\beta$ is measured by conventional means such as a potentiometer. The relative wind direction is sensed by a small airfoil represented at 63 which is pivoted ahead of its center of pressure in a low friction bearing. The angle this airfoil 63 makes with cable 61 is measured by a potentiometer (not shown) or by other suitable means, the angle so measured being the relative wind direction. The changes in this angle may then be used to change the angle airfoil 60 makes with cable 61.

Figure 7:
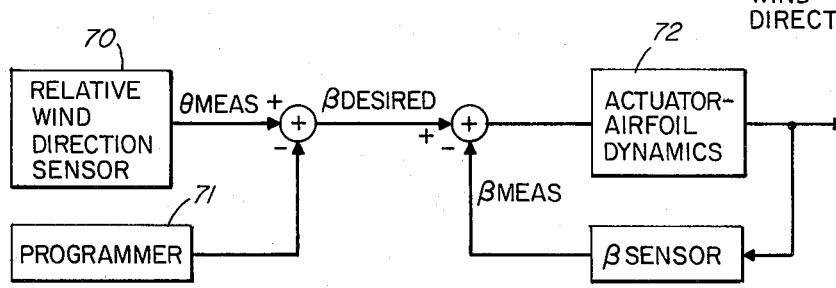
FIG. 7 is a block diagram of the automatic pitch control system.

The angle of attack adjustment is made by the automatic control system represented in FIG. 7. The relative wind direction sensor 70 produces at its output the angle $\theta$. From this is subtracted the desired angle of attack $\alpha$ from the programmer 71. The desired angle of attack is set before operation or in real time during power generation. This difference represents the desired pitch angle $\beta$ which the airfoil makes with its supporting cable. This desired angle $\beta$ is compared with the measured angle $\beta$ and the error signal activates the airfoil actuator 72 to slew the airfoil to the desired position. By this means the desired angle of attack is maintained even as the relative wind direction shifts because of bowing of the cables, for example.

The control system for maintaining the desired angle of attack may also be used to damp any large amplitude oscillations that may be set up in the cable system. It is not expected, however, that large amplitude oscillations will develop in this cable system as has happened with some suspension bridges of the "vibrating reed" kind of structure. This is so because the cable system disclosed herein is not a "vibrating reed" structure and the airfoil blades themselves are effective damping elements.

Referring again to FIG. 1, power will be absorbed from one or both of the wheels 12 and 13 to generate electricity, for example. If, for purposes of illustration, power is taken only from wheel 12 while wheel 13 is idling it is possible for the top cables to sag resulting in collisions between airfoils on the upper and lower part of the cable 11. Specifically, if the wheel 12 is moving counterclockwise, the torque developed in a generator acts on wheel 12 so as to cause the top part of cable 11 to sag. Such sagging is prevented by adjusting the differential torque of the two wheels so that they are more nearly equal. For this reason it is preferred that power be generated by both wheels.

A cable wind mill design for producing approximately 8 megawatts of power is shown in the table below.

TABLE

| | |
|---|---|
| Span | 5,000 feet |
| Airfoil Spacing | 10 feet |
| Number of Airfoils | 1,000 |
| Area per Airfoil | 1,000 sq. ft. |
| Nominal power per Airfoil | 8 KW at 14 m.p.h. wind |
| Total Nominal Power | 8 megawatts |
| Blade Weight per sq. ft. | 2 lbs. |
| Total Weight of Blades | 2,000,000 lbs. |
| Cable tension | 1,000,000 lbs. |
| Size of cable | 3" diameter |

It is thus seen that the objects of this invention have been achieved in that there has been disclosed a novel wind generating device for producing megawatt levels of power. In addition the apparatus is easy to implement with existing technologies.

Modifications and variations of the invention disclosed herein will occur to those skilled in the art and it is to be understood that such modifications and variations are intended to fall within the scope of the appended claims.

What is claimed is:

1. Wind power generating apparatus comprising:
   (1) at least one endless flexible cable supported on the peripheries of two spaced apart wheels, said cable thereby forming an elongate loop, the plane of said loop being substantially perpendicular to the wind direction;
   (2) a plurality of airfoils attached to said cable at spaced apart intervals along said cable and disposed for generating aerodynamic forces in a first direction along said cable when said airfoils are on one side of said loop and in the opposite direction when said airfoils are on the other side of said loop; said aerodynamic forces thereby causing said cable and said wheels to rotate;
   (3) means for absorbing power from at least one of said rotating wheels; and
   (4) means for applying lateral force to said cable at least at one location intermediate said wheels to counteract the lateral wind loading on said cable arising from the action of the wind on said airfoils.

2. The apparatus of claim 1 wherein said means for applying a lateral force to said cable comprises a plurality of idler wheels mounted on an equalizing carriage and adapted to engage said cable from the side; wherein said carriage is arranged to apply a lateral force to produce a desired curvature.

3. Wind power generating apparatus comprising:
   (1) at least one endless flexible cable supported on the peripheries of two spaced apart wheels, said cable thereby forming an elongate loop, the plane of said loop being substantially perpendicular to the wind direction;
   (2) a plurality of airfoils attached to said cable at spaced apart intervals along said cable and disposed for generating aerodynamic forces in a first direction along said cable when said airfoils are on one side of said loop and in the opposite direction when said airfoils are on the other side of said loop; said aerodynamic forces thereby causing said cable and said wheels to rotate;
   (3) means for absorbing power from at least one of said rotating wheels; and
   (4) wherein the torque resisting the rotation of said wheels is selectively adjustable to maintain the proper separation of said cable on adjacent sides of said loop.

4. Wind power generating apparatus comprising:
   (1) at least one endless flexible cable supported on the peripheries of two spaced apart wheels, said cable thereby forming an elongate loop, the plane of said loop being substantially perpendicular to the wind direction;
   (2) a plurality of airfoils attached to said cable at spaced apart intervals along said cable and disposed for generating aerodynamic forces in a first direction along said cable when said airfoils are on one side of said loop and in the opposite direction when said airfoils are on the other side of said loop; said aerodynamic forces thereby causing said cable and said wheels to rotate;
   (3) means for absorbing power from at least one of said rotating wheels;
   (4) wherein the pitch angle of each of said airfoils with respect to said cable is adjusted continuously along the cable length to improve power generation efficiency; and
   (5) a sensor located on each of said airfoils to detect the relative wind direction and means responsive thereto to vary the pitch angle of said airfoil.

5. Wind power generating apparatus comprising:
   (1) two endless flexible cables and two spaced apart pairs of coaxial wheels for supporting said cables to form elongate loops, the plane of each of said loops being substantially perpendicular to the wind direction, and each wheel of said pair adapted for supporting one of said cables on its periphery;
   (2) a plurality of cross members straddling said cables at intervals along said cables and attached thereto, each said cross member adapted for carrying at least one airfoil;
   (3) a plurality of airfoils attached to said cable at spaced apart intervals along said cable and disposed for generating aerodynamic forces in a first direction along said cable when said airfoils are on one side of said loop and in the opposite direction when said airfoils are on the other side of said loop; said aerodynamic forces thereby causing said cable and said wheels to rotate;
   (4) means for absorbing power from at least one of said rotating wheels; and
   (5) each wheel of said pair of wheels being individually mounted for rotation about the vertical axis, said wheels being coupled by flexible torque transmitting means.

6. The apparatus of claim 5 wherein said flexible means comprises universal joints.

7. Method for extracting power from the wind comprising the steps of:
   (1) providing two wheels mounted for rotation on opposite sides of a wind guiding and intensifying valley;
   (2) providing an endless flexible cable adapted to span said valley to form an elongate loop substantially perpendicular to said wind, and supporting said cable on the peripheries of said wheels;
   (3) providing a plurality of airfoils and attaching them to said cable at spaced apart intervals along said cable and disposing said airfoils for generating aerodynamic forces in a first direction along said cable when said airfoils are on one side of said loop and in the opposite direction when said airfoils are on the other side of said loop, said aerodynamic forces thereby causing said cable and said wheels to rotate;
   (4) providing means for absorbing power from at least one of said rotating wheels; and
   (5) providing means for applying lateral force to said cables at least at one location intermediate said wheels to counteract the lateral wind loading on said cables arising from the action of the wind on said airfoils.

8. Method for extracting power from the wind comprising the steps of:
   (1) providing two wheels mounted for rotation on opposite sides of a wind guiding and intensifying valley;
   (2) providing an endless flexible cable adapted to span said valley to form an elongate loop substantially perpendicular to said wind, and supporting said cable on the peripheries of said wheels;

(3) providing a plurality of airfoils and attaching them to said cable at spaced apart intervals along said cable and disposing said airfoils for generating aerodynamic forces in a first direction along said cable when said airfoils are on one side of said loop and in the opposite direction when said airfoils are on the other side of said loop, said aerodynamic forces thereby causing said cable and said wheels to rotate;

(4) providing means for absorbing power from at least one of said rotating wheels; and (5) providing a sensor on each of said airfoils adapted to detect the relative wind direction and providing means responsive to said detected relative wind direction to vary the pitch angles of said airfoils.

* * * * *